July 10, 1934.  H. F. MERRIAM  1,965,963
PROCESS FOR MAKING SULPHURIC ANHYDRIDE
Filed Aug. 11, 1930
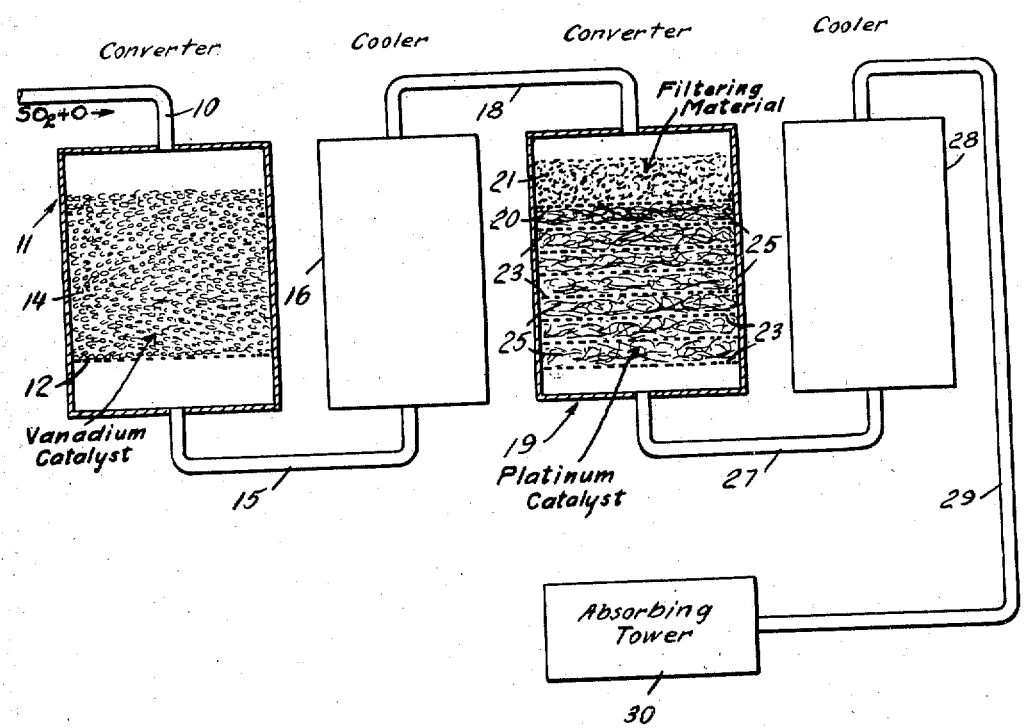
INVENTOR
Henry F. Merriam
BY
ATTORNEY Patented July 10, 1934

1,965,963

UNITED STATES PATENT OFFICE 1,965,963

PROCESS FOR MAKING SULPHURIC ANHYDRIDE

Henry F. Merriam, West Orange, N. J., assignor to General Chemical Company, New York, N. Y., a corporation of New York Application August 11, 1930, Serial No. 474,455

10 Claims. (Cl. 23—175)

This invention is directed to catalytic conversion processes employed in the production of sulphuric acid. The principal object of the invention lies in the provision of a new and improved process of increased simplicity and efficiency for conducting the formation of sulphuric anhydride from a gas mixture containing sulphur dioxide and oxygen.

In connection with the catalytic conversion of sulphur dioxide and oxygen to sulphuric anhydride, as a step in the process of the manufacture of sulphuric acid, platinum in one form or other as a catalyzer has usually been considered to give the most efficient conversion, and therefore is most generally employed. Platinum, however, is expensive, and moreover is rendered ineffective as a catalyst by certain impurities which are usually present in the gases. Fluorine compounds in the burner gases, even in small amounts, are particularly poisonous to platinum. For this reason, it has heretofore been found necessary when platinum is used as a catalyzer in the treatment of gases requiring purification to rely upon various complicated purification processes which generally result in the cooling and consequent wasteful dissipation of the heat of the gases. In prior processes of purification involving the employment of elaborate apparatus including the scrubbing towers, down draft coolers as for example disclosed in U. S. P. 1,113,437 to Herreshoff, coke box filters and other units, it has been necessary, in order to avoid contamination of the purified gases by fluorine, to discard the drips in the down draft coolers to eliminate fluorine impurities from the system. Such practice necessarily causes a loss of sulphuric acid. and requires close supervision to make certain that the fluorine compounds do not pass along through the system to the converters.

The present invention is primarily based on the discovery that vanadium, in a catalytically active form, has the property of removing or converting into non-harmful form, deleterious impurities from sulphur dioxide gas, particularly deleterious fluorine compounds which are poisonous to platinum catalytic material. The invention includes the passage of a gas mixture containing sulphur dioxide and oxygen intended for catalytic oxidation to sulphuric anhydride successively through a mass of material containing vanadium in catalytically active form, then preferably through a mass of filtering material to remove any suspended particles of dust or other solid matter from the gas stream, and finally through platinum catalytic material.

The invention may be successfully operated in any suitable known type of apparatus used in the contact sulphuric acid process, i. e., the invention contemplates the employment of apparatus well known in the art. The respective masses of vanadium catalytic material, the filtering medium, and the platinum catalyst may be arranged all within one stack converter, or may be contained in separate pieces of equipment inserted at separate points in the main gas line. In accordance with standard practice the catalytic material is preferably suitably supported in one or more conversion chambers including a gas inlet and a gas outlet adapted to be connected in series in the main gas line.

One preferred arrangement of apparatus includes the employement of two or more separate converters in series with intermediate coolers. In this instance the first converter is packed with the vanadium catalytic and gas purifying material, and the succeeding converter or converters contains the platinum catalytic material. The filtering unit may be disposed in the gas line at any point between the two bodies of catalytically active material. For example, the filter unit may be arranged within the first converter shell, between the vanadium-containing material and the chamber outlet. Alternatively, the filter unit may be included in the second converter containing the platinum catalyst. In this instance, it will, of course, be necessary that the filter unit be placed between the platinum catalytic material and the inlet of the conversion chamber. Further, the filtering material may be placed in a separate unit of apparatus arranged at any point in the gas line between the outlet of the first chamber and the inlet of the second chamber.

The construction of the separate chambers for the vanadium and the platinum material may differ in certain respects. The platinum is usually dispersed through a fibrous asbestos carrier, whereas the active vanadium is usually made up in pellet form. In the case of the platinum, the fibrous material may be supported in layers on a series of shelves. The pellets containing the vanadium are usually of such size that a chamber may be packed to a considerable depth without creating an undesirable resistance to the flow of gas therethrough. With these differences of the physical nature of the platinum and vanadium catalytic material in mind, any suitable reaction or conversion chambers may be designed and employed.

One suitable apparatus for carrying out the process of the invention is shown diagrammatically in the accompanying drawing. In the system illustrated, the sulphur dioxide-oxygen gas mixture is introduced through pipe 10 into the top of converter 11. A screen 12, held in place near the bottom of the converter, supports a body of vanadium catalytic material indicated at 14. Partially converted exit gases of converter 11 flow through pipe 15 into a cooler or heat exchanger 16 which may be of any approved construction, and as understood in the art is operated to cool the partially converted gases to the desired extent prior to continued conversion. The cooled gases are conducted through pipe 18 into the top of a second converter 19. Near the top of the latter is a perforated plate 20 supporting a body of filtering material 21. The converter may be provided with a series of perforated plates or shelves 23, each shelf supporting a body of platinized asbestos fiber 25. The exit gases of the converter run through pipe 27 into the bottom of a cooler 28, and the cooled gases flow through line 29 to an absorbing system 30.

As heretofore indicated, it has been found that a high percentage of the deleterious fluorine impurities is removed from the gas stream or converted into non-harmful form by the employment of vanadium in catalytically active form. The invention contemplates particularly the use of the vanadium catalytic material fully described in U. S. Patent No. 1,371,004, issued March 8, 1921, to Slama and Wolf. The product of this patent may be briefly described as a catalytic material containing vanadium in chemical combination distributed on a finely divided carrier. The details of manufacture of such catalytically active material are fully defined in the said patent, and further description thereof is unnecessary.

It should be understood that the vanadium material referred to in such patent is in itself a catalyst and promotes the catalytic oxidation of a mixture of sulphur dioxide and oxygen to sulphuric anhydride in a marked degree. However, a major feature of the present invention lies in the discovery that vanadium catalytic material has the property of removing or converting into non-harmful form, deleterious fluorine impurities in the gas stream. One outstanding practical advantage of the invention arising from this discovery of material value from a commercial viewpoint is that where the catalytically active vanadium material is employed in combination with a platinum catalyst, the vanadium catalyst serves to materially initiate the conversion of sulphur dioxide to sulphur trioxide, and at the same time removes or overcomes the effect of substantially all the fluorine compounds in the gas stream, and thus prevents poisoning of the platinum catalytic material.

According to the invention where the mode of procedure thus described is employed, the poisoning effects of deleterious fluorine compounds on the platinum catalyst are overcome, the useful life of the platinum catalyst is greatly increased, and the necessity of repacking the platinum converter at frequent intervals is avoided.

At present it is not understood just what the action of vanadium material on the deleterious fluorine impurities may be. One theory is that the fluorine is present largely as silicon fluoride which substance is decomposed on contacting with platinum catalytic material depositing silica thereon in such form as to poison or inhibit the catalytic activity of the platinum. It is thought that the vanadium catalytic material likewise decomposes the silicon fluoride causing deposition of silica on the vanadium catalytic material where its presence is not harmful. The fluorine remaining after decomposition, which is probably present as fluorine gas or hydrofluoric acid, is thought to pass through the system without damaging the platinum catalytic material. The foregoing is presented as a theory only, and it is to be understood that the invention is not dependent upon the correctness thereof.

It has further been found that a high percentage of the deleterious fluorine compounds of the gases can be removed or converted into non-harmful form according to the present process when operating at temperatures ranging from about 700° F. to about 1200° F. It will be observed that such temperatures are those ordinarily employed for the conversion of a mixture of sulphur dioxide and oxygen to sulphur trioxide by the contact process. It will be seen that the plant may thus be continuously operated at temperatures most favorable for conversion of the gases and at the same time employing the present invention for the purpose of increasing the efficiency of the conversion process as a whole and avoiding poisoning of the platinum catalyst.

I claim:

1. The process of catalytically oxidizing sulphur dioxide to sulphur trioxide which comprises passing a gaseous mixture containing sulphur dioxide and oxygen at a reactive temperature through a mass of catalytic material containing vanadium, and then through platinum catalytic material.

2. The process of catalytically oxidizing sulphur dioxide to sulphur trioxide which comprises passing a gaseous mixture containing sulphur dioxide and oxygen at a reactive temperature through a mass of catalytic material containing vanadium in chemical combination distributed on a finely divided carrier, and then through platinum catalytic material.

3. The process of making sulphuric anhydride which consists in subjecting a gas mixture containing sulphur dioxide and oxygen at a reactive temperature to the action first of vanadium in catalytically active form, and then to platinum.

4. In the process of converting sulphur dioxide to sulphuric anhydride including the use of platinum catalytic material, the steps of purifying the sulphur dioxide gas by passing it through a mass containing vanadium in a catalytically active form before the gas passes to said platinum material, and then passing the gas through the platinum catalytic material.

5. In the process of converting sulphur dioxide to sulphuric anhydride including the use of platinum catalytic material, the steps of purifying the sulphur dioxide gas by passing it through a mass containing vanadium in a catalytically active form, through a filtering medium, and then passing the gas through the platinum catalytic material.

6. The process of catalytically oxidizing sulphur dioxide to sulphur trioxide which comprises passing the gaseous mixture containing sulphur dioxide and oxygen at a temperature between about 700 F. and about 1200 F. through a mass of catalytic material containing vanadium in a catalytically active form, and then through platinum catalytic material.

7. The process of catalytically oxidizing sulphur dioxide to sulphur trioxide which comprises passing a gaseous mixture containing sulphur dioxide and oxygen at a temperature between about 700° F, and about 1200° F. through a mass of material containing vanadium in chemical combination distributed on a finely divided carrier, and then through platinum catalytic material.

8. The process of catalytically oxidizing sulphur dioxide to spulphur trioxide which comprises passing a gaseous mixture containing sulphur dioxide to sulphur trioxide which comture through a mass of catalytic material containing vanadium, and then through a second mass of catalytic material susceptible to poisoning by deleterious fluorine impurities.

9. The process of making sulphuric anhydride which consists in subjecting a gas mixture containing sulphur dioxide and oxygen at a reactive temperature to the action first of vanadium in catalytically active form, and then of a catalytic material susceptible to poisoning by deleterious fluorine impurities.

10. The process of catalytically oxidizing sulphur dioxide to sulphur trioxide which comprises passing a gaseous mixture containing sulphur dioxide and oxygen at a reactive temperature through a mass of catalytic material contining vanadium in oxide form, and then through platinum catalytic material.

HENRY F. MERRIAM.

CERTIFICATE OF CORRECTION.

Patent No. 1,965,963.                                July 10, 1934.

HENRY F. MERRIAM.

It is hereby certified that error appears in the printed specification of the above numbered patent requiring correction as follows: Page 3, line 7, claim 8, for "spulphur" read sulphur; and line 9, for "to sulphur trioxide which com-" read and oxygen at a reactive tempera-; and that the said Letters Patent should be read with these corrections therein that the same may conform to the record of the case in the Patent Office.

Signed and sealed this 25th day of September, A. D. 1934.

Leslie Frazer (Seal)                                Acting Commissioner of Patents.

about 700° F, and about 1200° F. through a mass of material containing vanadium in chemical combination distributed on a finely divided carrier, and then through platinum catalytic material.

8. The process of catalytically oxidizing sulphur dioxide to spulphur trioxide which comprises passing a gaseous mixture containing sulphur dioxide to sulphur trioxide which comture through a mass of catalytic material containing vanadium, and then through a second mass of catalytic material susceptible to poisoning by deleterious fluorine impurities.

9. The process of making sulphuric anhydride which consists in subjecting a gas mixture containing sulphur dioxide and oxygen at a reactive temperature to the action first of vanadium in catalytically active form, and then of a catalytic material susceptible to poisoning by deleterious fluorine impurities.

10. The process of catalytically oxidizing sulphur dioxide to sulphur trioxide which comprises passing a gaseous mixture containing sulphur dioxide and oxygen at a reactive temperature through a mass of catalytic material contining vanadium in oxide form, and then through platinum catalytic material.

HENRY F. MERRIAM.

CERTIFICATE OF CORRECTION.

Patent No. 1,965,963.                                July 10, 1934.

HENRY F. MERRIAM.

It is hereby certified that error appears in the printed specification of the above numbered patent requiring correction as follows: Page 3, line 7, claim 8, for "spulphur" read sulphur; and line 9, for "to sulphur trioxide which com-" read and oxygen at a reactive tempera-; and that the said Letters Patent should be read with these corrections therein that the same may conform to the record of the case in the Patent Office.

Signed and sealed this 25th day of September, A. D. 1934.

Leslie Frazer (Seal)                                              Acting Commissioner of Patents.